US007280258B2

(12) United States Patent
Kitahara et al.

(10) Patent No.: US 7,280,258 B2
(45) Date of Patent: Oct. 9, 2007

(54) LOGO DATA GENERATING SYSTEM, LOGO DATA GENERATING METHOD, AND DATA STORAGE MEDIUM

(75) Inventors: Katsuhito Kitahara, Kagishima (JP); Kazuyuki Yokoyama, Matsumoto (JP); Yukiharu Horiuchi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 828 days.

(21) Appl. No.: 10/033,674

(22) Filed: Dec. 27, 2001

(65) Prior Publication Data
US 2002/0089686 A1 Jul. 11, 2002

Related U.S. Application Data

(60) Provisional application No. 60/317,794, filed on Sep. 7, 2001, provisional application No. 60/317,918, filed on Sep. 7, 2001.

(30) Foreign Application Priority Data
Jan. 5, 2001 (JP) ............................ 2001-000671
Feb. 7, 2001 (JP) ............................ 2001-030900

(51) Int. Cl.
H04N 1/46 (2006.01)
(52) U.S. Cl. ...................... 358/501; 358/502; 358/504; 358/1.15; 358/296; 399/24; 399/27; 399/29; 347/7; 347/19
(58) Field of Classification Search ............... 358/1.14, 358/296, 501, 502, 504, 1.15; 399/27, 24, 399/29; 347/7, 19
See application file for complete search history.

(56) References Cited

U.S. PATENT DOCUMENTS 3,958,509 A * 5/1976 Murray et al. ........... 101/350.1
4,422,765 A * 12/1983 Hoffman ..................... 356/432
4,873,570 A 10/1989 Suzuki et al. ................. 358/80
5,045,967 A 9/1991 Igarashi ...................... 364/518
5,467,196 A 11/1995 Fukushima et al. ......... 358/298
5,493,386 A * 2/1996 Thompson .................... 399/28
5,581,375 A 12/1996 Ma ............................. 358/518
5,592,298 A * 1/1997 Caruso ....................... 358/504
5,680,230 A 10/1997 Kaburagi et al. ........... 358/298
5,740,333 A 4/1998 Yoh et al. ................... 395/109
5,782,567 A * 7/1998 Endo .......................... 400/621

(Continued)

FOREIGN PATENT DOCUMENTS

EP        0 596 706        5/1994

(Continued)

OTHER PUBLICATIONS

Ithaca—Press Release, "Transact Technology's Color Inkjet Printer Provides New Marketing Opportunities", Apr. 17, 2000, 1 page.

(Continued)

Primary Examiner—Aung S. Moe
Assistant Examiner—Jacob P. Rohwer

(57) ABSTRACT

A logo data generating system and logo data generating method indicate the amount of ink required to print a logo during the logo editing and creation process. The system includes a source image capture controller for capturing a source image that is the foundation for logo data creation; an image processor image that processes the captured source image to generate the logo data; an ink consumption calculator that generates user-readable attribute data indicating the amount of ink required to print the logo data from the number of color pixels in the logo data image processed by the image processor; and a display controller that displays the attribute data on a display device so that the user can recognize from the displayed attribute data how much ink is required to print the logo data being edited.

39 Claims, 13 Drawing Sheets

U.S. PATENT DOCUMENTS

| | | | | |
|---|---|---|---|---|
| 5,802,420 | A * | 9/1998 | Garr et al. | 399/27 |
| 5,874,988 | A * | 2/1999 | Gu | 348/97 |
| 5,905,894 | A * | 5/1999 | De Bonet | 717/146 |
| 5,930,009 | A * | 7/1999 | Sato et al. | 358/518 |
| 6,027,200 | A * | 2/2000 | Takahashi et al. | 347/19 |
| 6,188,493 | B1 | 2/2001 | Esaki et al. | 358/505 |
| 6,206,504 | B1 | 3/2001 | Payne | 347/43 |
| 6,359,695 | B1 | 3/2002 | Takahashi et al. | 358/1.1 |
| 6,377,359 | B1 * | 4/2002 | Higashio | 358/1.2 |
| 6,381,348 | B2 * | 4/2002 | Takeo | 382/128 |
| 6,459,419 | B1 | 10/2002 | Matsubayashi | |
| 6,486,966 | B1 | 11/2002 | Takahashi et al. | 358/1.1 |
| 6,490,053 | B1 | 12/2002 | Takahashi et al. | 358/1.18 |
| 6,529,202 | B2 * | 3/2003 | Wu | 345/593 |
| 6,631,967 | B1 * | 10/2003 | Saruta | 347/19 |
| 6,647,126 | B1 * | 11/2003 | Wen | 382/100 |

FOREIGN PATENT DOCUMENTS

| | | | |
|---|---|---|---|
| JP | 61-208578 | 9/1986 | |
| JP | 61-250722 | 11/1986 | |
| JP | 62-88071 | 4/1987 | |
| JP | 63-060672 | 3/1988 | |
| JP | 63-172662 | 7/1988 | |
| JP | 63298578 | 12/1988 | |
| JP | 1-206052 | 8/1989 | |
| JP | 2-84364 | 3/1990 | |
| JP | 2-293921 | 12/1990 | |
| JP | 03121571 | 5/1991 | |
| JP | 4-190466 | 7/1992 | |
| JP | 4-264915 | 9/1992 | |
| JP | 06006600 | 1/1994 | |
| JP | 6-24046 | 2/1994 | |
| JP | 06-217048 | 8/1994 | |
| JP | 6-227078 | 8/1994 | |
| JP | 6-88427 | 11/1994 | |
| JP | 7-66974 | 3/1995 | |
| JP | 7-66975 | 3/1995 | |
| JP | 07-089053 | * | 4/1995 |
| JP | 7-175613 | 7/1995 | |
| JP | 8-84268 | 3/1996 | |
| JP | 08-090767 | 4/1996 | |
| JP | 8-169142 | 7/1996 | |
| JP | 8-230269 | 9/1996 | |
| JP | 8-282016 | 10/1996 | |
| JP | 9-66643 | 3/1997 | |
| JP | 9-135325 | 5/1997 | |
| JP | 9-200554 | 7/1997 | |
| JP | 09247470 | 9/1997 | |
| JP | 10-051770 | 2/1998 | |
| JP | 10-086461 | 4/1998 | |
| JP | 10134178 | 5/1998 | |
| JP | 10-148574 | 6/1998 | |
| JP | 10149441 | 6/1998 | |
| JP | 10164380 | 6/1998 | |
| JP | 11-69173 | 3/1999 | |
| JP | 11-070780 | 3/1999 | |

OTHER PUBLICATIONS

Ithaca—Press Release, "Transact Unveils Color Inkjet Printer; Turns The World of POS Upside Down", Apr. 17, 2000, 1 page.

Ithaca—Press Release, "Transact's New POSjet Chosen For Peripheral Systems Techtour At Retail Systems 2000", Apr. 17, 2000, 1 page.

Ithaca—Press Release, "Transact's New Color InkJet POS Printer Meets Hospitality Industr Needs And Is Also A Brand Builder", Apr. 20, 2000, 1 page.

Ithaca—"How To Use The PJ1000 Image Converter", before Apr. 17, 2000, 12 pages.

* cited by examiner

CALCULATION DATA (PRINTER MODEL-SPECIFIC DATA): SAMPLE

| CONTENT | PRINTER MODELS | | |
|---|---|---|---|
| | A | B | C |
| INK CONSUMPTION PER DOT | a1 | b1 | c1 |
| HEAD CLEANING DATA (INK CONSUMPTION PER DAY FOR HEAD CLEANING) | a2 | b2 | c2 |
| INK CARTRIDGE DATA (INK CAPACITY PER COLOR) | a3 | b3 | c3 |
| RESOLUTION | a4 | b4 | c4 |
| | | | |
| OTHER | an | bn | cn |

FIG. 3(a)

CALCULATION DATA (ENVIRONMENT-SPECIFIC DATA): SAMPLE

| AVERAGE NUMBER OF RECEIPTS PRINTED IN 1 DAY | E1 |
|---|---|
| NUMBER OF WORK DAYS PER YEAR | E2 |
| AVERAGE NUMBER OF CHARACTERS PER SHEET | E3 |
| LOGO PRINTING (YES/NO) | E4 |
| BAR CODE PRINTING (YES/NO, SIZE, OTHER) | E5 |
| COUPON PRINTING (YES/NO, SIZE) | E6 |
| PRINT MODE DATA | E7 |
| | |
| OTHER | En |

FIG. 3(b)

IMAGE (LOGO) INK CONSUMPTION (SAMPLE)

INK CONSUMPTION AND CARTRIDGE LIFE

| ITEM | CONTENT |
| --- | --- |
| PER RECEIPT | INK CONSUMPTION, COLOR 1 XX; COLOR 2 XX |
| PER DAY | INK CONSUMPTION, COLOR 1 XX; COLOR 2 XX |
| CARTRIDGE LIFE | NUMBER OF WORKING DAYS: XX DAYS |
| PRINTABLE NUMBER OF CHARACTERS | XXXXX THOUSAND CHARACTERS |
| PRINTABLE NUMBER OF RECEIPTS | XXXXX SHEETS |

LOGO DATA GENERATING SYSTEM, LOGO DATA GENERATING METHOD, AND DATA STORAGE MEDIUM

CONTINUING APPLICATION DATA

This application claims the benefit of U.S. Provisional Application Nos. 60/317,794, filed Sep. 7, 2001, and 60/317,918, filed Sep. 7, 2001.

BACKGROUND OF THE INVENTION

1. Field of the Invention

The present invention relates generally to a logo data generating system, and relates more specifically to a method and a device for generating logo data so that the amount of ink required to print the logo can be determined.

2. Description of the Related Art

By using 256 shades each for red, green, and blue, color graphic processes can generate full-color images from a pallet of more than 16 million different colors for display or printing on widely available computer systems. Full-color printers capable of printing these full-color images are also widely available now. These color printers typically use cyan (C), magenta (M), yellow (Y), and black (K) ink to express the full range of colors by mixing small amounts of different colors of ink.

Printer manufacturers have in the past focused on improving the speed and economy of monochrome (black and white) printers for business applications, but as color graphic technologies have improved full-color printers are also finding use in business applications.

However, while full-color printers offer the advantage of rich color expression, printing takes longer and operating costs are higher. This is a particular problem in business applications such as point-of-sale (POS) terminals where there is a one-on-one relationship between the printer user and the customer to whom printer output is handed because printing must be completed in the shortest possible time. To speed printer output in POS systems, image data for the logo that is printed on every receipt is therefore stored inside the printer so that a print logo command can be simply sent to the printer to read the image from memory, thereby saving the image data transmission time, requiring less time to complete printing, and effectively increasing printer throughput. This method of storing logo image data in the printer is especially important for POS systems that print a color logo because color image files are so large. This logo printing technology is not limited to POS system applications and can be used in any field where the same image is repeatedly printed. For example, this technology can be used in specialty printers such as used in ATMs to print a transaction record at the time of each transaction (such printers are referred to below as transaction printers).

When such transaction printers are used for color printing, it is preferable to limit the number of printable colors to two or three in order to improve both printing economy and speed. The above described logo printing technology and technology for color printing limited to two or three colors will be increasingly important for POS printers in the distribution industry, bank ATM printers, and other types of specialty transaction printers that repeatedly print the same image, including queuing number printers, parking lot ticket printers, and kiosk terminal printers in convenience stores.

Transaction printers typically print predominately text information in black. Therefore, if the printer can only print two colors, the two colors will usually be black and one other color, such as red, green, or blue. It will also be obvious that a two-color printer could print two colors not including black, or one color could be added so that the printer can print with three colors.

It will also be obvious that such a limited-color printer cannot print full-color images or images containing many colors. When the logo image is generated, it is therefore necessary to reduce the full-color image, for example, to the number of colors that the printer can handle. Relatively high design quality and print quality are desirable in logos printed by such transaction printers. Furthermore, when printing is limited to two or three colors, the color reduction process and color assignment can greatly affect the overall impression made. Great care must therefore be used to generate the logo.

The large number of logos printed each day by a typical transaction printer based on this logo data means that the amount of ink required to print the logo greatly affects printer operating costs. It is therefore desirable to be able to know when creating and editing the logo data how much ink will be required to print the logo because the designer could then also consider this ink consumption data to design a logo that is more economical to print. A particularly large amount of ink is required to print a logo containing a background image, for example, and the selection and colors used in the background image are therefore particularly important elements to consider when designing the logo.

Furthermore, if a two or three color printer is used for color printing and a background image covering a large area is printed with the same color, ink consumption may be biased so that one color of ink is consumed more quickly. If one color of ink is consumed more quickly, that ink cartridge will also need replacing more frequently. This increases printer maintenance. It is therefore desirable for the available ink colors to be consumed at substantially equal rates.

OBJECTS OF THE INVENTION

The present invention is directed to a solution for the above problems, and an object of this invention is to provide a logo data generating system and logo data generating method whereby attribute data enabling the user to know how much ink is required to print a logo can be displayed while the logo data is being created or edited.

Another object of this invention is to provide a logo data generating system and logo data generating method enabling attribute data indicating how much ink is required to print a color logo to be displayed for each color of ink used.

A further object of this invention is to provide a logo data generating system and logo data generating method that can estimate the life of an ink cartridge used in a transaction printer for printing a logo.

SUMMARY OF THE INVENTION

"Logo data" as used herein means the image data for the logo.

A "logo" as used herein means an image to be printed by a printer such as a POS printer, and does not mean, for example, a corporate logo or a store logo per se. Furthermore, the logo shall not be limited to an image printed by a POS printer, and refers generally to an image that is printed frequently, such as to a receipt printed at the time of a transaction, and includes images that are stored in a non-volatile memory in the printer, for example, and are printed when a specific print command occurs during the printing process. Images printed repeatedly based on previously stored image data by a POS, ATM, parking lot ticket, queuing ticket, or other transaction printer are therefore logos as used herein. In addition to corporate logos, store logos, and the like, a logo as used herein includes images that are printed on a printed sheet based on substantially any kind of previously stored image data, including images containing advertising slogans, product coupons, service coupons, or other type of image data containing an announcement or other information.

Creating or generating logo data as used herein also includes editing logo data that is being created or was previously created.

Furthermore, a "color pixel" as used herein means a pixel of any color (including black) other than white (that is, non-printing color) that is part of the logo data.

In addition, "ink" as used herein includes all pigmentation materials used to produce color (including black) for the purpose of printing an image, and is not limited to ink such as that specifically used in an ink jet printer.

Finally, a "printed sheet" as used herein means a receipt or other printed form having a logo printed on all or part of the form with transaction information or other specific information printed thereto in a specific format. Examples of such printed sheets include customer receipts issued at a point of sale, parking lot tickets, queuing number tickets, and ATM transaction receipts.

This invention calculates the number of color pixels in a logo being edited or created, calculates attribute data based on this color pixel count enabling the user to recognize ink consumption required to print the logo, and displays the attribute data together with the logo. How much ink is required to print the logo can therefore be determined when the logo is created, and printer operating cost required to print the logo can be known. The number of receipts that can be printed with one ink cartridge can also be calculated from this ink consumption information. The ink cartridge life can also be calculated.

According to a first aspect of this invention, an apparatus for creating logo data to be printed by a printer is provided. The apparatus comprises an operating unit; a capturing unit for obtaining an original image that is subject to image processing in response to an operation performed via the operating unit; an image processing unit for processing the original image to generate logo data for printing by the printer; an ink-amount calculating unit for calculating data that substantially relates to an ink-amount required for printing the logo data generated by the image processing unit; and a display unit for displaying the logo data and the ink-amount data.

The operating unit may be an input device, such as a keyboard and/or mouse, etc. The capturing unit may obtain the original image from any of a variety of mediums, such as a floppy disk, an image scanner, a web site, etc.

The ink-amount may be, for example, ink weight or volume, the ratio of multiple colors of ink to be used, etc. The amount of ink required to print the image processed logo data can therefore be determined based on the displayed ink-amount data which can indicate ink consumption either directly or indirectly.

Other features which may be employed in connection with the above logo data generating system are identified below.

The ink-amount calculating unit may determine a number of color pixels in the logo data as attribute data. The total amount of ink required to print the logo can be determined in general by determining the number of color pixels.

The ink-amount calculating unit may determine a pixel count for each color of the color pixels in the logo data as attribute data, and the display unit may display the pixel count for each color as attribute data.

Ink-usage required for printing can be determined for each ink color by thus displaying the pixel count for each color, and ink consumption for each color can be estimated when the logo data is generated. The operating cost related to logo printing can therefore be reduced by using a lighter logo color or changing the balance of colors used in the logo, and the balance of ink consumed by logo printing can be adjusted.

The ink-amount calculating unit can calculate as attribute data the respective pixel counts of a first and second printing color in the logo data, and the display unit may display the first color pixel count and the second color pixel count as respective attribute data.

The ink-amount calculating unit may determine the total number of color pixels for all colors, and determine a percentage of each color pixel count relative to the total pixel count, as attribute data. The ratio of colors used in the logo can therefore be determined when the logo is created, and the logo data can therefore be generated with consideration for the relative amounts of ink of each color consumed to print the logo.

The ink-amount calculating unit may calculate a count of color pixels in the logo data, and calculate the product of the color pixel count multiplied by an ink amount used to print a pixel, as attribute data. It is therefore possible to determine directly and specifically the total amount of ink consumed for logo printing.

The ink-amount calculating unit may calculate a count of color pixels for each color in the logo data, and calculate the product of the color pixel count multiplied by ink consumption used to print a pixel for each color in the logo data, as attribute data. It is therefore possible to determine directly and specifically the total amount of ink of each color consumed for logo printing.

The ink-amount calculating unit may read an amount of ink consumed for one dot stored for each printer model, and calculate ink consumption as the product of the read ink consumption amount multiplied by the color pixel count as attribute data. Ink consumption can thus be determined more accurately because ink consumption can be calculated according to the model of printer used for printing.

The ink-amount calculating unit may also store for each type of print sheet a standard ink-usage other than for printing the logo data, and calculate ink-usage per printed sheet from the standard ink-usage and the ink-usage for logo data printing as attribute data. The actual ink consumption can thus be determined, and the printing cost per receipt can be specifically calculated.

The ink-amount calculating unit may calculate as attribute data a number of sheets that can be printed per ink cartridge from a previously stored ink cartridge capacity and calculated ink-usage per printed sheet.

The ink-amount calculating unit may also calculate average ink cartridge life from the calculated ink-usage per printed sheet and a previously stored average number of print sheets issued in a specific time.

The calculated results from the ink-amount calculating unit can be externally output as print data in conjunction with the logo data. The logo data and attribute data can therefore printed.

The printer may be a POS printer or ATM printer, and the logo data may be image data stored in the printer for printing to a printed sheet such as a sales receipt, transaction receipt, or other form.

Another aspect of the invention involves a logo data generating method for generating logo data printing by a transaction printer. The method comprises the steps of: (a) capturing a source image for image processing; (b) generating logo data, including non-printing pixels and color pixels of a single color or multiple colors, by processing the source image based on defined image processing conditions; (c) calculating attribute data indicating an amount of ink required to print the logo data being generated by the processing step (b); (d) displaying the generated logo data and attribute data; and (e) confirming input requesting termination of image processing, repeating steps (b) to (d) when input is not confirmed, and storing the newest logo data generated in step (b) when the input is confirmed.

Other features which may be employed in connection with the above logo data generating method are identified below.

The attribute data calculating step may calculate a number of color pixels in the logo data as the attribute data.

The attribute data calculating step may calculate a pixel count for each color of the color pixels in the logo data as the attribute data for each color, and the display step (e) displays the pixel count for each color of the color pixels as attribute data.

The attribute data calculating step may calculate as the attribute data the pixel count of a first color and the pixel count of a second color in the logo data when the logo data has a first color, a second color, and a non-printing color; and the display step displays the first color pixel count and the second color pixel count as respective attribute data.

The attribute data calculating step may calculate the total number of color pixels for all colors, and a percentage of each color pixel count relative to the total pixel count, as attribute data.

The attribute data calculating step may calculate a count of color pixels in the logo data, and the product of the color pixel count multiplied by ink consumption used to print a pixel unit, as attribute data.

The attribute data calculating step may calculate a count of color pixels for each color in the logo data, and the product of the color pixel count multiplied by ink consumption used to print a pixel unit for each color in the logo data, as attribute data.

The attribute data calculating step may read an amount of ink consumed for one dot stored for each printer type input in the input step, and may calculate ink consumption as the product of the read ink consumption amount multiplied by the color pixel count as attribute data.

The attribute data calculating step may additionally calculate ink-usage per printed sheet from the ink-usage for logo data printing and a previously stored standard ink-usage per printed sheet for ink-usage other than logo data printing.

The attribute data calculating step may further calculate a number of sheets that can be printed per ink cartridge from a previously stored ink cartridge capacity and ink-usage per print sheet as attribute data.

The attribute data calculating step may further calculate average ink cartridge life from the calculated ink-usage per print sheeted and a previously stored average number of printed sheets issued in a specific time.

In accordance with another aspect of the invention, a host system having a data transmission unit for sending logo data to an inkjet printer for printing a logo on a receipt using multiple colors of ink is provided. Such a host system comprises a reading unit for reading source data for the printed logo; a first computing unit for calculating a size for logo data printed by the printer based on the source data read by the reading unit; a second computing unit for calculating ink-usage for each color used in the logo; a display unit for displaying at least the logo size calculated by the first computing unit, or the ink-usage calculated by the second computing unit.

The source data for the logo data to be printed specifically includes image data read by a scanner operating as the reading unit, or an image file stored to a floppy disk, hard disk, CD-ROM, or any other known computer- or machine-readable medium on which data can be stored. Image file(s)/data can also be received over a network, such as the Internet, and stored to a local storage device or medium of the personal computer.

The size of the logo data to be printed may be calculated automatically as a result of reading the source data on the PC.

The inkjet printer for printing the receipts is preferably a POS printer for printing to roll paper, and stores the logo data sent from the host system to non-volatile memory. The host system may be a host computer connected to the POS printer, and more specifically may be a personal computer.

The computing units for calculating the logo size and ink-usage is preferably a control device built in to the PC. The display unit is preferably a CRT, LCD, or other such display device. The data transmission unit for sending the logo data is preferably a serial interface or parallel interface of the PC.

Still another aspect of the invention involves a logo data generating method of a host system for sending logo data to an inkjet printer printing logo data on a receipt using multiple colors of ink. This method comprises reading source data for the printed logo; calculating a size for logo data printed by the printer based on the source data read by the reading step; calculating ink-usage for each color used in the logo; and displaying at least the logo size calculated by the size calculating step, or the ink-usage calculated by the ink-usage calculating step.

The method may further comprise the step of reprocessing the logo data based on the displayed ink-usage.

By displaying ink-usage for the colors of ink, the user/operator can change the amount of ink for each color used in the logo data based on the displayed data, and can use the displayed data as a guide for creating the logo data. If, for example, there are two printable colors of ink, say red and black, the user can balance red and black ink consumption and create the logo data while taking in consideration the difference in ink consumption when the logo is printed.

If ink consumption of each color is not substantially balanced (if each logo is 85% black and 15% red, for example), the black ink will be depleted well before the red ink (assuming the ink cartridges are the same size). This is because the same data is printed on every receipt and the same amount of each color of ink is consumed on each receipt.

Of course, when there are only two colors of ink, the colors shall not be limited to black and red; they could be black and green, black and blue, or some other combination of colors.

A further aspect of this invention includes a machine-readable medium embodying a program of instructions for directing a machine, such as a computer or other processor-controlled device, to execute the logo data generating methods described above, or steps thereof. The program and data set can be stored in any known computer- or machine-readable medium including a floppy disk, magneto-optical disk, optical disk, IC memory, magnetic recording tape, or electromagnetic signal, such as a carrier wave. For example, the program and data set can be stored in ROM or RAM and the program executed and the data processed by a central processing unit (CPU).

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 3(a) shows an example of the information stored to model-specific data memory 25, and (b) shows an example of the information stored to environment-specific data memory 26;

DESCRIPTION OF THE PREFERRED EMBODIMENTS

Figure 1:
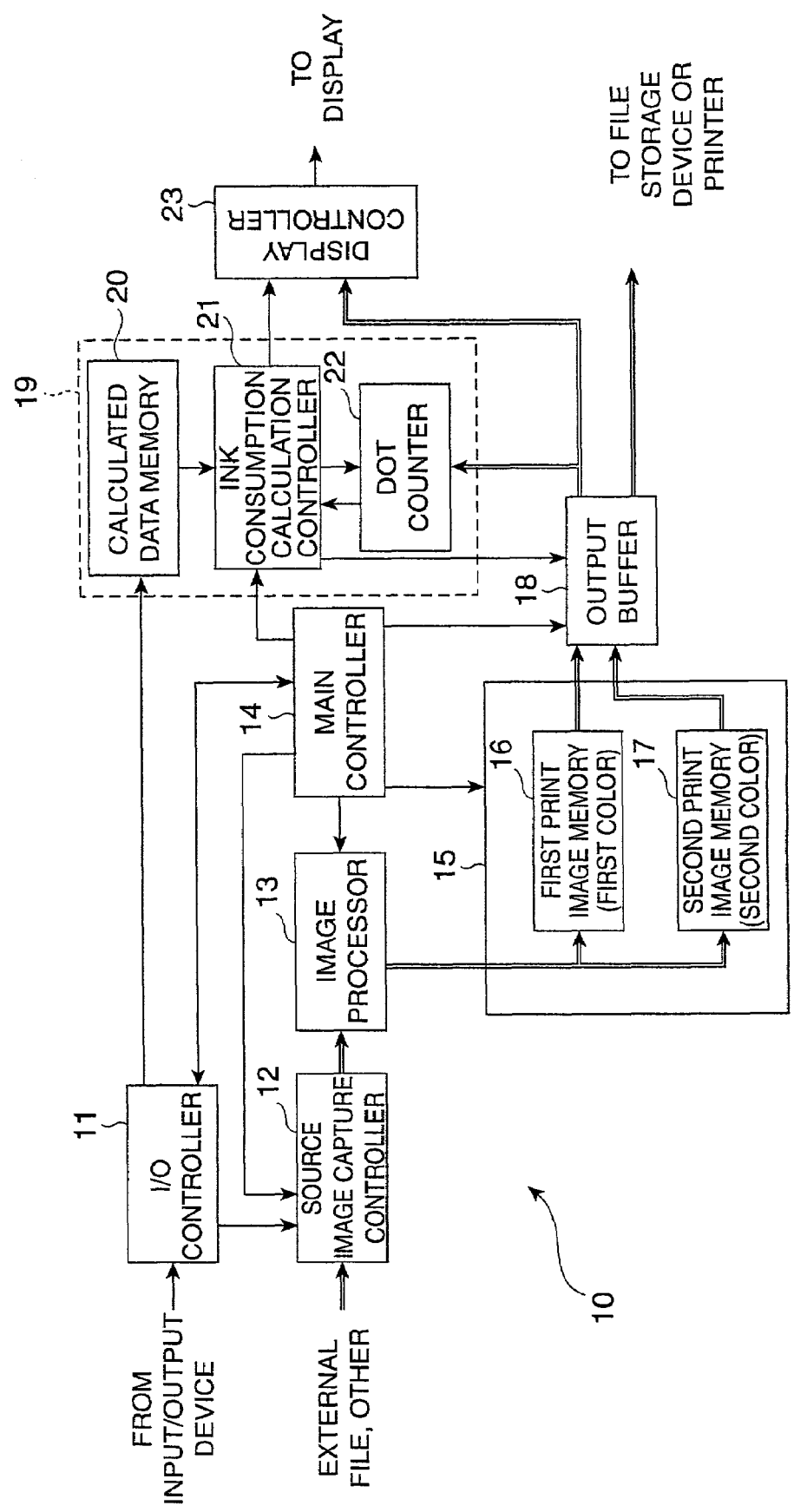
FIG. 1 is a block diagram showing the functions of a logo data generating system according to a first embodiment of the invention.

A preferred embodiment of the present invention is described below with reference to the accompanying figures. It will be noted that the following embodiments are shown by way of description only and do not limit the scope of the invention. It will be apparent to one skilled in the related art from the following description taken in connection with the drawings that various alternative embodiments can be achieved by replacing some or all of the elements described below with equivalent elements. All such variations are included in the scope of this invention.

As described above, it is desirable to know as accurately as possible when editing and creating the logo data how much ink will be consumed to print a logo. A POS system, for example, prints a large number of receipts every business day. A logo identifying the store, for example, is usually printed on every receipt. Advertising information is also frequently printed on the receipt. Knowing how much ink is required to print a logo is therefore a valuable tool enabling the designer to determine printer operating cost per receipt, that is, how much it will cost in terms of ink to print each receipt. A system for creating or editing logo data for printing by this type of POS printer is one of the most typical applications for a logo data generating system according to the present invention. The following description of this preferred embodiment of the invention is therefore based on creating logo data for a POS printer.

As noted above, POS printers print a large number of logos every day. It therefore follows that in addition to design and brand recognition, it is also necessary to consider economy, that is, the amount of ink consumed to print the logo data, when creating the logo.

A. Printing an Image

Printers print images according to print data and print commands received from a host system. POS printers can also receive the image data to be printed at each print operation. The effective printer throughput drops, however, when all print data, including the image data, is sent from the host for each print operation because image data files are large. POS printers therefore internally store the image data needed for frequently printed logos, and read the logo data from memory when a logo print command is received. When the logo data to be printed is an RGB data file, it is converted to CMYK color data for printing.

The logo data is stored in nonvolatile memory in the printer as print image data consisting of a matrix of pixels or dots. If the logo contains multiple colors, the logo data can be stored as RGB color data but it is usually stored as CMYK color data enabling direct printing. RGB to CMYK conversion techniques are known from the literature and further description thereof is thus omitted below. It is further assumed that the logo data generated by the logo data generating system of this invention is ultimately stored after conversion to CMYK color data.

A typical procedure whereby a POS printer prints a logo is described briefly below without reference to the figures.

When a logo print command is received from a host device, the POS printer reads the logo data specified by the command from memory. The read logo data is then converted to a print image identical to the logo in the print buffer. If the logo data contains multiple colors, the print image stored to the print buffer consists of a matrix of pixels or dots digitized for each print color so that, for example, a pixel or dot is on if the corresponding color prints and is off if that color does not print (or vice versa). The resulting dot data digitized for each color and stored in the print buffer is then sent to the print head of the corresponding color under the control of the printing controller.

The print mechanism prints by driving the print heads according to the on or off state of the received dots. For example, the print head of an ink jet printer discharges ink when a dot is on. An ink cartridge is connected to each print head and ink is supplied to the print head from the ink cartridge.

The amount of ink consumed for logo printing is proportional to the number of pixels or dots in the print image (logo) that are set to on (that is, to print). Furthermore, this dot data is generated separately for each color. It is therefore possible to determine from this dot data (pixel count) how much ink is required to print a logo.

It will be noted that this invention does not relate directly to the printing operation but rather relates to generating the logos to be printed, and further description of the print operation of the printer is therefore omitted.

B. Preferred Embodiment of a Logo Data Generating System of the Invention

FIG. 1 is a block diagram showing the functions of a logo data generating system 10 according to a preferred embodiment of this invention. As shown in FIG. 1 this logo data generating system 10 has an input/output (I/O) controller 11, source image capture controller 12, image processor 13, main controller 14, print image storage medium 15, output buffer 18, ink consumption calculator 19, and display controller 23. This embodiment further assumes a two-color printer. The print image storage medium 15 therefore has a first print image memory 16 and a second print image memory 17. The ink consumption calculator 19 consists of a calculated data memory 20, ink consumption calculation controller 21, and dot counter 22.

Under the control of the main controller 14, the logo data generating process starts with the source image that is the basis for logo data generation being captured from an external file, a scanner, or other external source as controlled by the source image capture controller 12. The source image capture controller 12 could be a file reader controller or a scanner controller, for example, and can read a full-color image or other image data file from which the logo data is generated from a floppy disk, hard disk, CD-ROM, memory card, or any other known computer- or machine-readable medium. An image file or data may also be received over a network, such as the Internet. If the source image capture controller 12 also has a drawing function, it could be configured to draw the source image according to command input from the I/O controller 11.

The source image captured by the source image capture controller 12 is processed by image processor 13. The image processor 13 is controlled by the main controller 14 and runs various image processes, including color reduction of the source image. The logo data is also generated by adjusting the resolution and size of the source image according to the functions of the printer used for printing. How colors are assigned when generating a two-color image from a multi-color source image for printing to a two-color printer (a printer with two colors of ink) greatly affects the image made by the printed logo. As also noted above, the amount of ink used to print a logo greatly affects the operating cost of a transaction printer, and it is therefore desirable when generating the logo data to be able to consider logo economy, that is, how much ink of what colors is needed to print the logo being edited.

Furthermore, various processes can be used in the image process generating the logo data, including different color reduction methods, gray scale processes, color gradation processing using luminance conversion, color assignment processes, and color gradation assignment such as area gradation, but the present invention does not relate directly to image processing and further discussion of specific image processing technologies is therefore omitted. We simply note that the image processor 13 of this invention can use a variety of known image processing technologies.

The logo data generated by the image processor 13 is stored in the print image storage medium 15. It will be remembered that the print image storage medium 15 has storage areas for two image colors, that is, first print image memory 16 and second print image memory 17, and images can therefore be expressed (printed) in three colors including the non-printing color (that is, the color of the print medium, usually white). An even greater range of color expression is possible using an area gradation method and three colors. For example, if colors are dithered using four dots per color unit, up to fifteen colors can be expressed. This embodiment of the invention, however, maintains a 1:1 correlation between image pixels and the dots used to print the image (logo) so that one pixel in the logo data maps to one dot in the printed image.

It will be further noted that while this embodiment is described for logo data generated for a two-color printer and therefore has two image storage units, first print image memory 16 and second print image memory 17, the invention can be applied to printers capable of printing more than two colors. For example, images for a full-color logo can be stored by providing four storage units for C, M, Y, and K images. Full-color logo data can also be stored using only three image memory units if the image is defined in the RGB or YUV color system. In this case, however, the image data must be converted to CMYK color data before printing.

When the logo data is stored in print image storage medium 15, it is sent under the control of the main controller 14 from first print image memory 16 and second print image memory 17 through output buffer 18 to the display controller 23 for presentation on the display. The main controller 14 controls the ink consumption calculator 19 to calculate the amount of ink required to print the logo.

The ink consumption calculator 19 controls dot counter 22 to count the number of dots requiring ink discharge in the dot patterns for each color in the logo data sent to the display controller 23 (that is, the number of on bits in the logo data), and thus counts the total number of dots printed (the number of color pixels) for each color in the logo. The total number of on dots for each color in the logo (also referred to herein as the print dots or color pixels) is thus accumulated and sent to the ink consumption calculation controller 21.

When the ink consumption calculation controller 21 receives the print dot count, it reads the ink discharge volume per dot for the nozzles of the print head from the calculated data memory 20, and multiplies the discharge volume by the total dot count for each color determined by the dot counter 22. The results are then sent to the display controller 23 for presentation on the display as attribute data indicating the amount of ink of each color required to print the logo. The user can then refer to this information to determine if ink consumption is excessive or biased too much toward one color. This information can then be used to lighten the background color, convert part of the logo to not print, change the color in part of the logo, or otherwise edit the image to reduce ink consumption or change the ratio of colors used. The ink consumption attribute data does not need to directly express the amount of ink consumed and the print dot count can be used as the attribute data.

Figure 2:
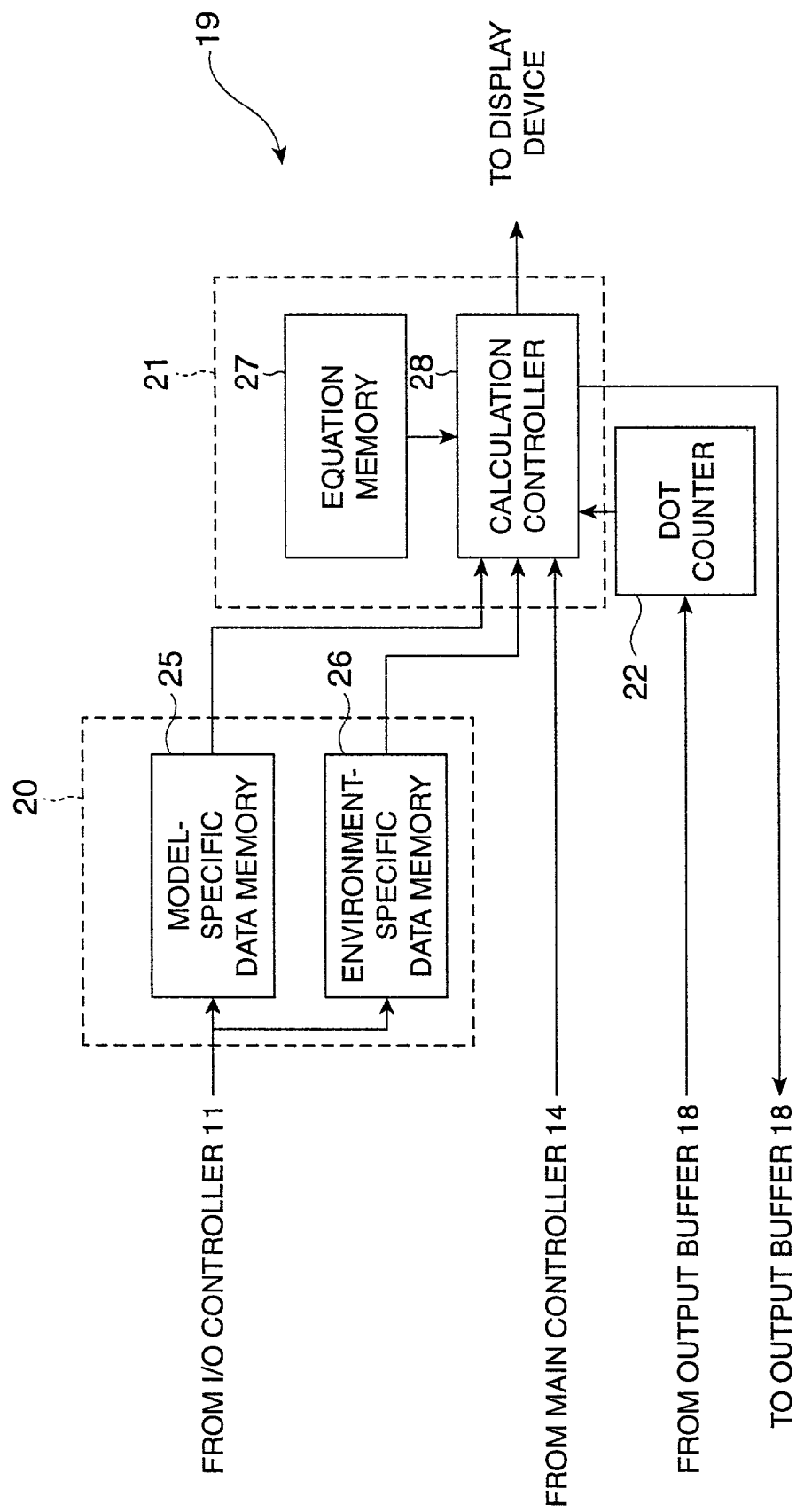
FIG. 2 is a block diagram showing the functional configuration of an ink-usage calculator part of the logo data generating system according to a first embodiment of the invention.

The ink consumption calculator 19 is described in further detail with reference to FIG. 2, which is a block diagram showing the configuration of the ink consumption calculator 19 in a logo data generating system 10 according to this embodiment of the invention. As shown in FIG. 2, the calculated data memory comprises a model-specific data memory 25 and environment-specific data memory 26, and the ink consumption calculation controller 21 has a calculation controller 28 and equation memory 27. The model-specific data memory 25 stores information specific to the printer model affecting ink consumption. The environment-specific data memory 26 stores information relating to the printer application environment affecting ink consumption.

FIG. 3(a) shows some of the information stored in model-specific data memory 25, and FIG. 3(b) shows some of the information stored in environment-specific data memory 26. Why ink consumption differs in different printer models is indicated by the model-specific data shown in FIG. 3(a). For example, the ink volume discharged per dot is directly related to the amount of ink required to print one image (logo), while the ink volume used for head cleaning and number of receipts printed affect ink cartridge life.

The environment-specific data shown in FIG. 3(b) includes the average number of receipts printed per day, the number of work days per year, the logo size and whether a logo is printed, the bar code size and whether a bar code is printed, and the print mode. These parameters affect the amount of ink required for one receipt and the ink cartridge life. Ink consumption and cartridge life thus change according to the printer work environment. The average characters printed per receipt, the print mode, logo size and whether a logo is printed, bar code size and whether a bar code is printed directly affect ink consumption per receipt. The number of work days per year and whether a coupon is printed affect cartridge life. It will be further noted that the data items in FIG. 3 are shown by way of example only; it is not necessary to store/use all of these items. Other items not shown can be used in addition to or as a substitute for these items.

In addition, the items shown in FIG. 3 indicate general categories for which more specific information is also provided. In any case, all factors affecting ink consumption, factors arising from the printer model or type, printer operating conditions, settings, operating environment and use, as well as information required to calculate ink consumption, even information that cannot be clearly placed into one particular category, can be included in the data stored in the model-specific data memory 25 and environment-specific data memory 26. The stored content can be set and controlled using the I/O controller 11. Elements printed to the receipt include (1) the logo (graphic), (2) transaction information (text, bar code), and (3) coupon information (text, bar code, graphic). In this case, receipts printed by the printer could include only element (2), elements (1) and (2) or elements (2) and (3), or elements (1), (2), and (3).

Ink consumption for each type of receipt can be determined by determining ink consumption for each color in each of the print elements contained in the receipt, and then obtaining the total for each color. Receipt types and constituent print elements in this embodiment are:

A: transaction information and coupon text;
B: logo and coupon graphic;
C: transaction information and coupon bar code.

Ink consumption for a type A receipt can be calculated by multiplying the average number of characters per receipt (including number of characters in the coupon information if a coupon is printed) by the ink consumption per character (obtained, for example, from the ink discharge per dot and average number of dots per character).

Ink consumption for a type B receipt can be similarly calculated from the total number of print dots in the image and ink discharge per dot.

Ink consumption for a type C receipt can be calculated from the dot count in the same way as a type B receipt, but can also be computed from the bar code size because the bar code print ratio is approximately 50%.

The ink consumption calculator 19 is further described below referring again to FIG. 2. Using the model-specific data and environment-specific data read from the calculated data memory 20 and the total dot count received from the dot counter 22, the calculation controller 28 calculates the ink used to print the logo and other ink consumption requirements. The equations used for these calculations are stored in equation memory 27. The calculation controller 28 thus reads the necessary equations and calculates ink-usage, the number of printable receipts, number of printable characters, and ink cartridge life.

Various equations known to one skilled in the art can be used by this invention to calculate ink consumption and other consumption estimates by applying the model-specific data and environment-specific data. Any logo data generating system that calculates and displays the required information using an equation known to one skilled in the art is also included in the scope of the present invention.

The functions of a logo data generating system 10 thus comprised can be achieved with various configurations having a central processor (CPU or microprocessor), ROM, RAM, display device, input/output device, interface, control program stored to ROM or RAM, and the necessary data sets. The logo data generating system 10 is achieved by integrating the control program and data set with the CPU, ROM, RAM, and display. The control program and data set, as well as a data storage medium recording the control program and data set, are therefore also included within the scope of this invention.

C. Logo Data Generating Method

A method for generating logo data enabling ink consumption to be displayed is described next with reference to FIG. 4, which is a flow chart of a logo data generating method for displaying ink consumption according to the present invention. The first step is to create or capture the source image for which logo data is to be generated (S101). This step can be accomplished by reading an image from an image file, capturing an image with a scanner, creating an image with a graphics program, or editing a scanned or read image. The source image is the processed to generate an appropriate print image (logo data) (S102). As described with the logo data generating system above, the logo can be generated with various image processing techniques, including color reduction, image synthesis, and color assignment. The resulting print image data (logo data) is then stored in the print image storage medium 15 (S103). The amount of ink required to print the print image (logo) is then calculated and presented on the display (S104). Whether any change is to be made to the print image data (logo) is then determined (S105). If the print image data is not set; that is, change is required (S105 returns no), the image processing and ink consumption calculation processes repeat (S102 to S105). If the print image data is set, meaning there is no change in the print image data (logo data) (S105 returns yes), the process ends. The resulting print image data (logo data) can be output as an image file, printed on a printer connected to the logo data generating system, or stored directly in a transaction printer.

Figure 4:
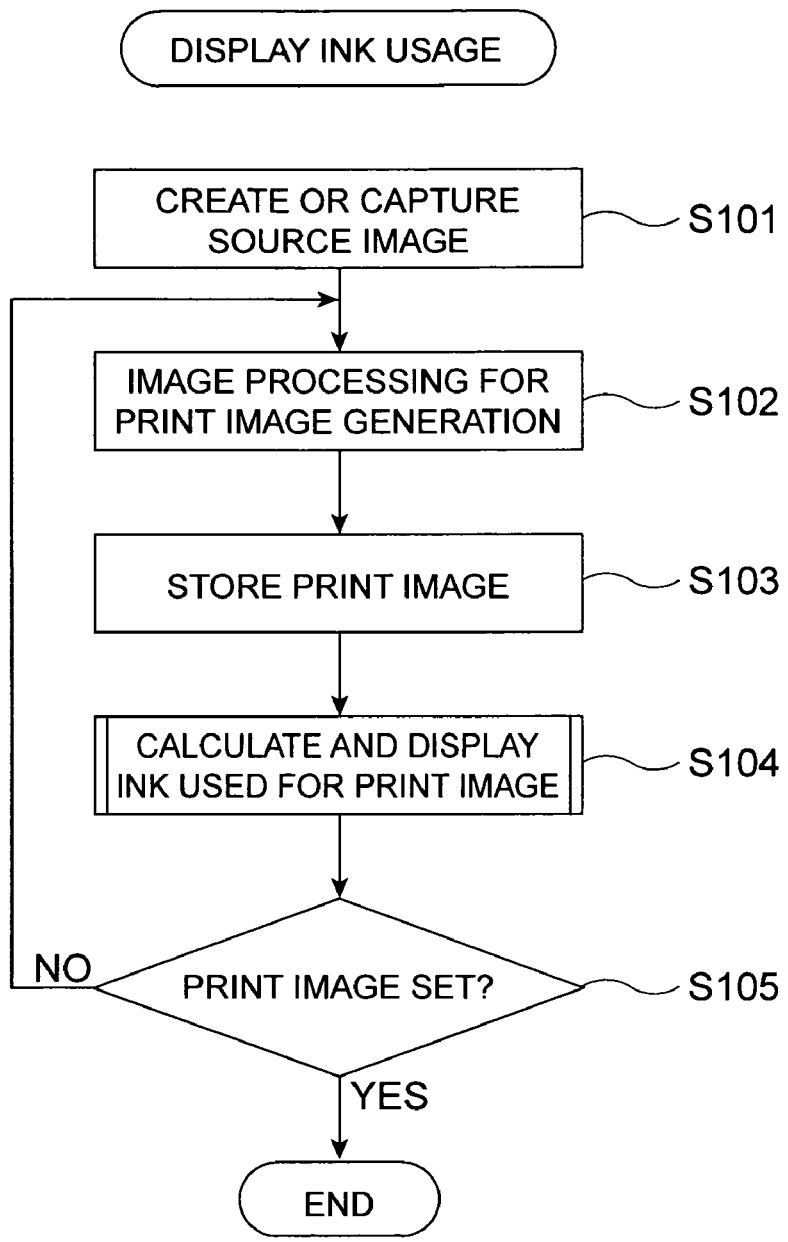
FIG. 4 is a flow chart of a logo data generating method according to a first embodiment of the invention.
Figure 5:
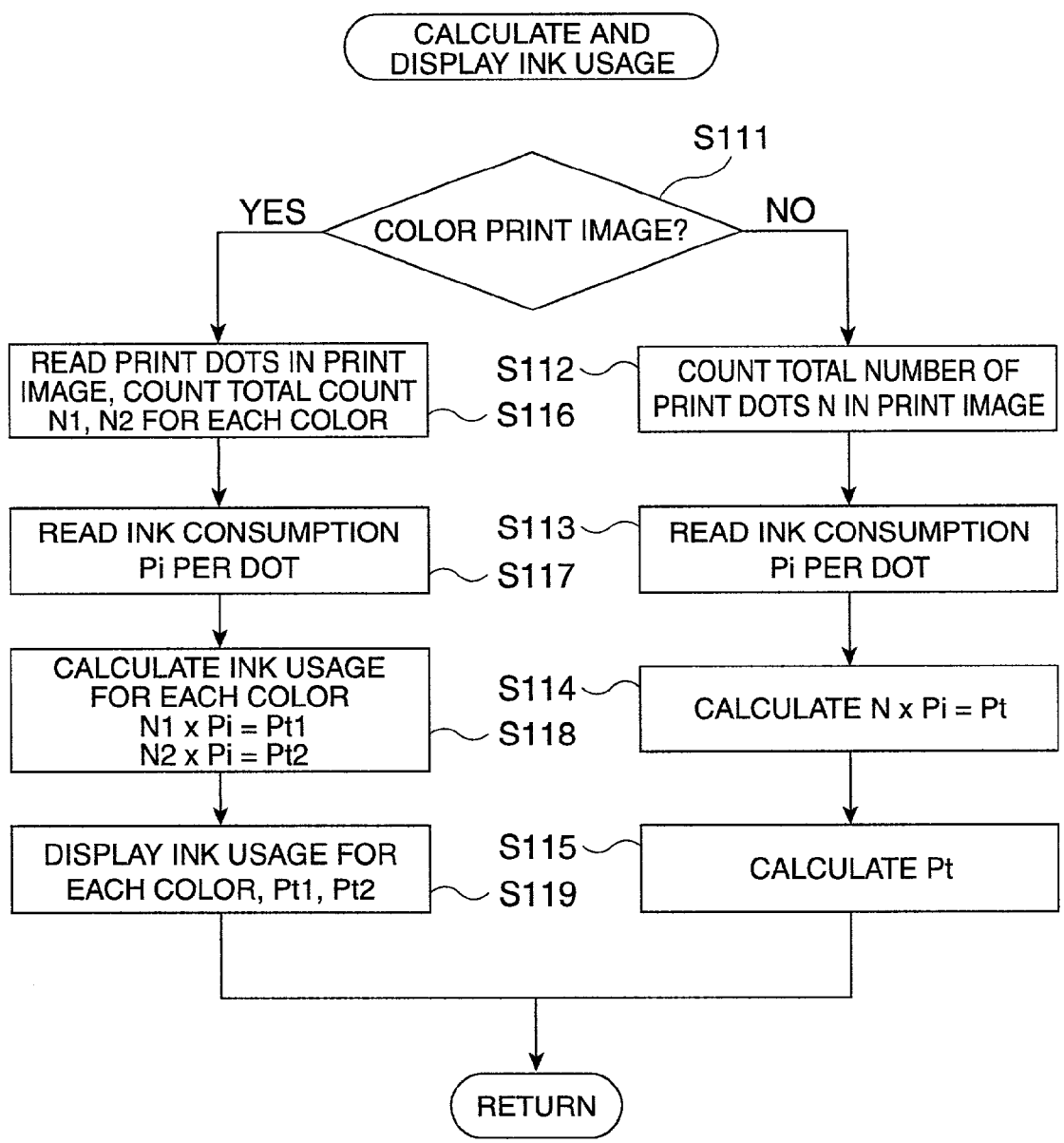
FIG. 5 is a flow chart showing a first embodiment of the ink-usage calculation and display step shown in FIG. 4.

The ink consumption calculation and display step (S104) shown in FIG. 4 is described in further detail with reference to FIG. 5, which is a flow chart of the ink consumption calculation and display step (S104) shown in FIG. 4 according to this first embodiment of the invention.

When the image processing step ends and the print image data (logo data) is stored (S103, FIG. 4), it is determined if the stored logo data is a color image (S111). If not (S111 returns no), the total print dots N in the stored logo data is counted (S112). Once the total print dot count N is determined, the ink discharge Pi per dot discharged from the nozzle is read from internal memory (S113). Ink consumption Pt required to print the logo is calculated as dot count N×Pi (S114), and the result is presented for confirmation by the user (S115).

If a color image is stored (S111 returns yes), the number of print dots in the logo data is counted for each color to obtain print dot counts N1 and N2 for the respective colors (S116). The ink discharge for each dot discharged from a nozzle is then read (S117). Note that the ink discharged from the nozzle is assumed to be the same for each color in step S117. Dot counts N1 and N2 are then multiplied by ink discharge Pi to calculated ink consumption Pt1 and Pt2 for the respective colors in the logo (S118), and the resulting ink consumption values Pt1 and Pt2 are displayed (S119).

Figure 6:
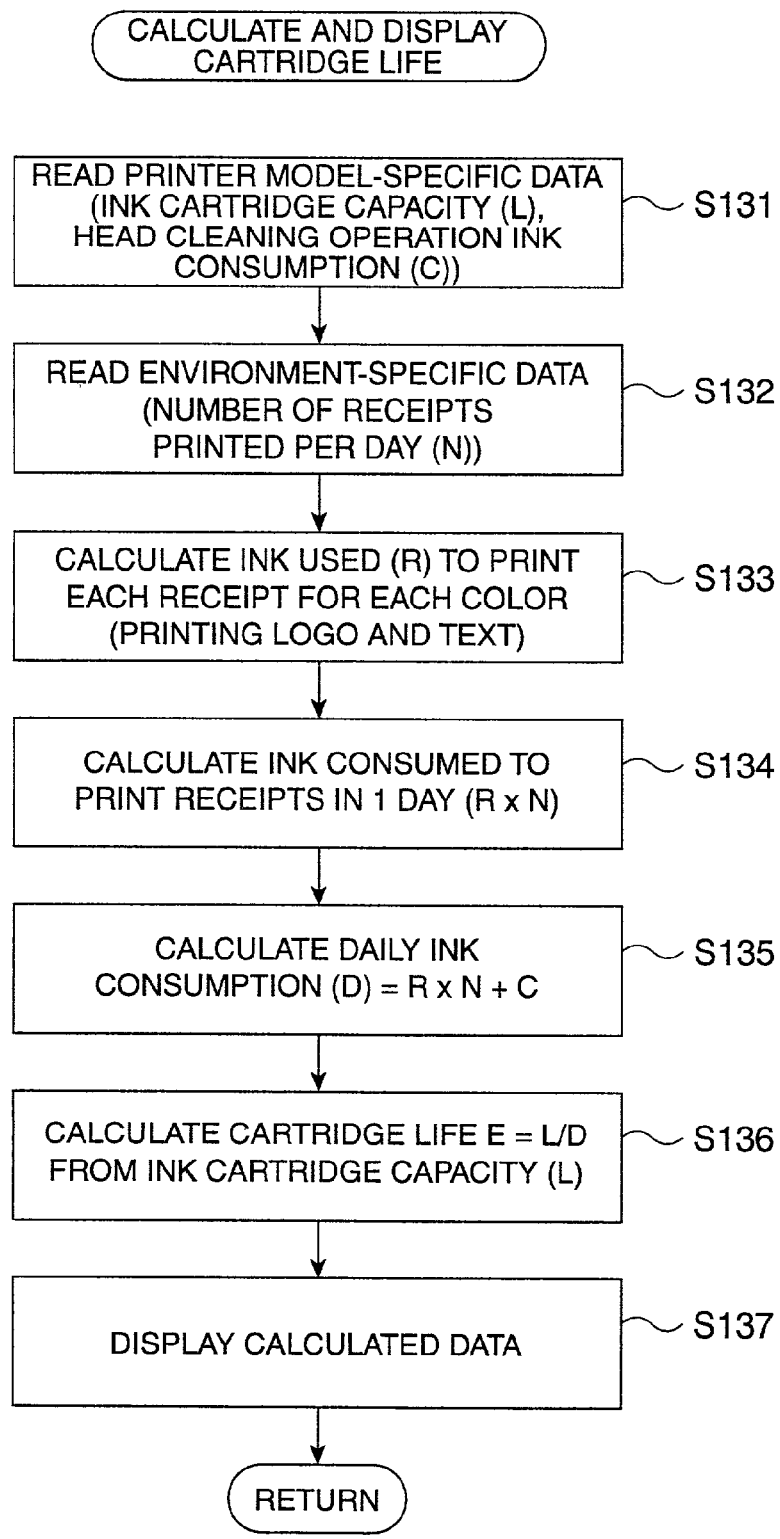
FIG. 6 is a flow chart showing a second embodiment of the ink-usage calculation and display step shown in FIG. 4.

An alternative ink consumption calculation and display process is described next with reference to FIG. 6, which is a flow chart of a cartridge life calculation process illustrating a second embodiment of the ink consumption calculation and display step (S104) shown in FIG. 4. When the image processing step ends and the logo data is stored (S103 in FIG. 4), printer model-specific data such as the ink cartridge capacity (L) and ink consumed (C) by the head cleaning operation (S131), and environment-specific data such as the number of receipts printed per day (N), is read (S132). This model-specific data and environment-specific data is as described above with reference to FIG. 3.

The amount of ink used (R) to print one receipt is then calculated based on the read printer model-specific data and environment-specific data (S133). This per-receipt ink requirement (R) differs according to the size of the logo, whether a logo is printed, the size of the bar code, whether a bar code is printed, and other factors. The amount of ink consumed to print one receipt is then calculated based on the environment-specific data. Note that here and below ink consumption is calculated separately for each color if the receipt is printed in color. When the per-receipt ink requirement (R) is determined, the amount of ink consumed in one day for receipt printing (R×N) is determined from per-receipt ink requirement (R) and the number of receipts printed per day (N) (S134). The daily ink consumption (D) is then calculated by adding the daily head cleaning operation ink consumption (C) to the daily receipt printing ink consumption (R×N), although it will be noted that the head cleaning operation ink consumption (C) is not directly attributable to printing (S135). When the daily ink consumption (D) is determined, the ink cartridge capacity (L) is divided by the daily ink consumption (D) to determine the ink cartridge life E (=L/D) as the number of work days that a single ink cartridge will last (S136).

The resulting ink consumption data, including the ink consumption for logo printing, is then displayed when requested or according to predefined conditions (S137). It will also be apparent that the calculated ink consumption data can be printed out with or separately from the logo as requested.

D. Ink Consumption Display Sample

Figure 7:
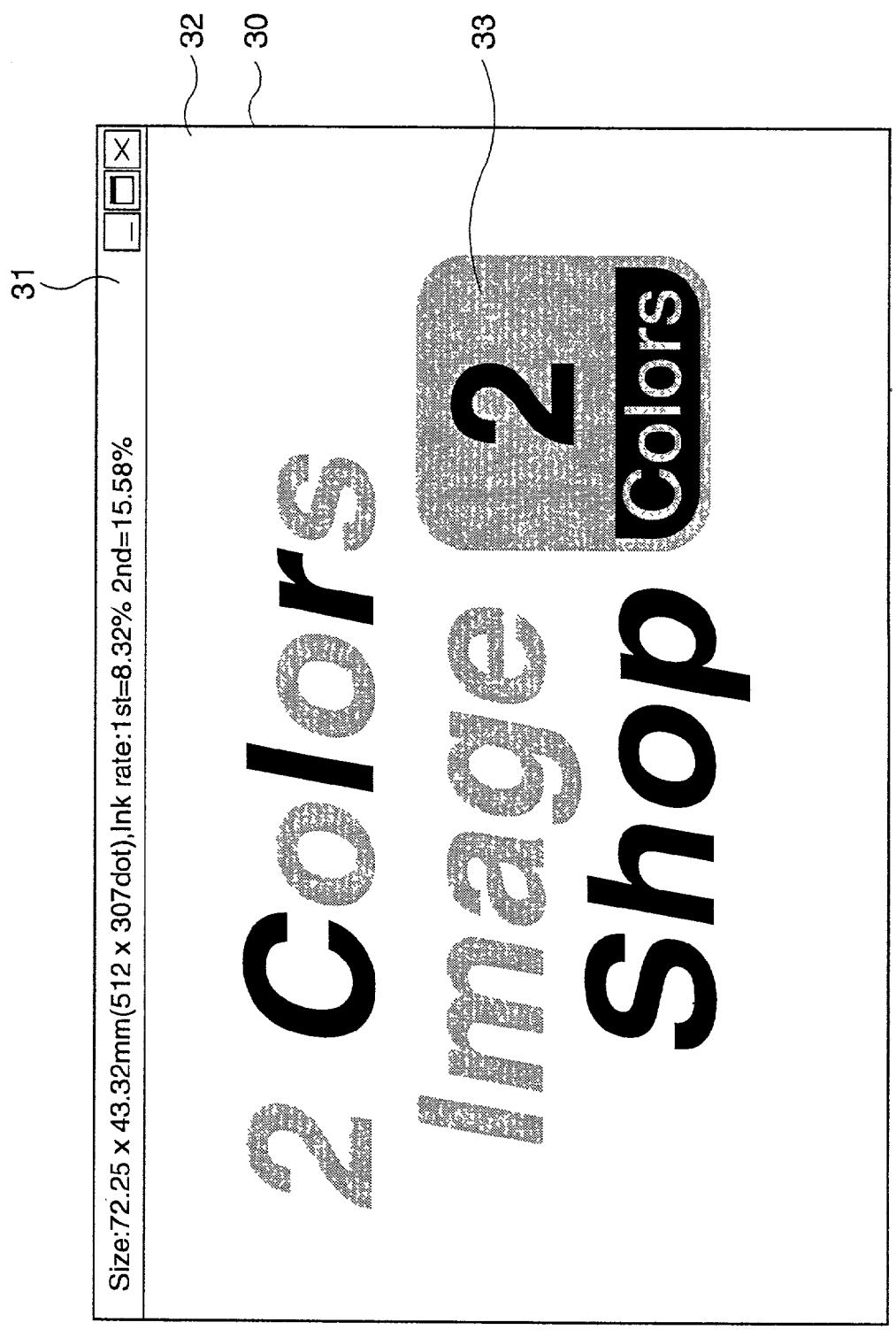
FIG. 7 shows a display screen presenting a logo created as the print image and the amount of ink required to print the logo.

FIG. 7 shows a sample display screen 30 for displaying a logo image preview based on the created logo and the amount of ink required to print the logo. This sample display screen 30 has a logo data display 31 line at the top of the screen and a logo display 32 for showing a preview of the logo. This sample logo has text printed in different colors and a substantially square mark 33 containing text and numbers in two different colors. Note that while shown in black and white only in FIG. 7, the letters and mark 33 are assumed to be printed in black (first color) and red (second color) in this embodiment. In addition, the logo data display 31 indicates that the logo measures 72.25×43.32 mm (not shown in actual size in the figure), that the total number of pixels in the logo is 512×307 dots, that the first color covers 8.32% and that the second color covers 15.58% of the logo. By referring to the total pixel count of the logo and the color allocation shown in the logo data display 31, the user can then determine the total amount of ink required to print the logo and the relative amounts of first and second color inks used. The logo data display 31 shown in FIG. 7 does not directly indicate ink consumption, but indirectly displays the amount of ink required for printing by displaying the total number of printed dots (color pixels) in the logo. The first and second color ink percentages shown in the logo data display 31 in FIG. 7 are calculated by the ink consumption calculator using the number of dots printed in each color (color pixels), but the number of printed dots (color pixels) can be directly displayed rather than calculating the color percentages.

Figure 8:
FIG. 8 shows three different samples of printed receipts.

FIG. 8 shows three different sample receipts. Print sample 1 contains text data only and no logo. This type of receipt can be printed with the least amount of ink. Print sample 2 contains the logo shown in FIG. 7 as well as a bar code 34 and advertising information 35. A relatively large amount of ink is consumed to print this type of receipt. Print sample 3 contains a logo 36 and discount coupon 37. As will be known from these different types of receipts, modern POS systems can print various types of information to a receipt to excellent effect, but ink consumption also increases greatly. It follows that operating cost can be greatly affected by, for example, using a lighter or darker color to print the background of the logo 36 shown in print sample 3.

Figures 9A, 9B:
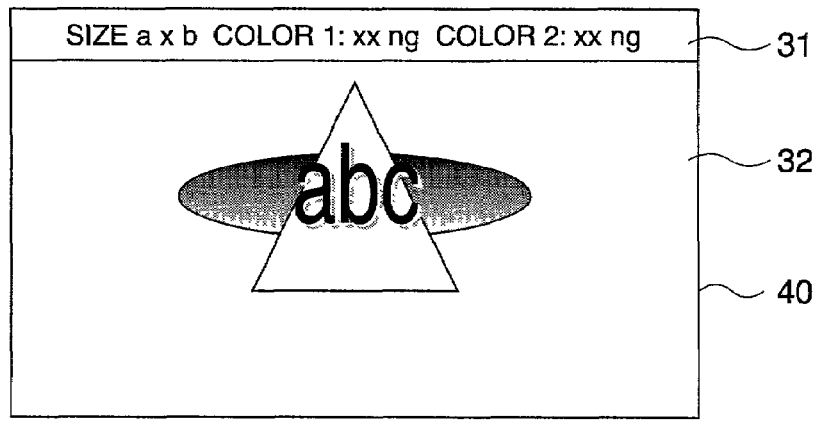
FIG. 9(a) shows another display screen presenting a logo and ink consumption information, and (b) shows a screen displaying ink cartridge life information.

FIG. 9(a) shows another sample logo and ink consumption display screen 40, and FIG. 9(b) shows a cartridge life display sample. The display screen 40 has logo data display 31 and logo display 32 areas. The display screen 40 in FIG. 9(a) also shows the size of the logo in the logo data display 31 together with the first and second ink color consumption. Note that this example expresses ink consumption by weight. The ink cartridge life display shown in FIG. 9(b) is a table showing information related to ink consumption and cartridge life.

E. Logo Data Generating System Editing Screen

E1. Creating the Source Image

Figure 10:
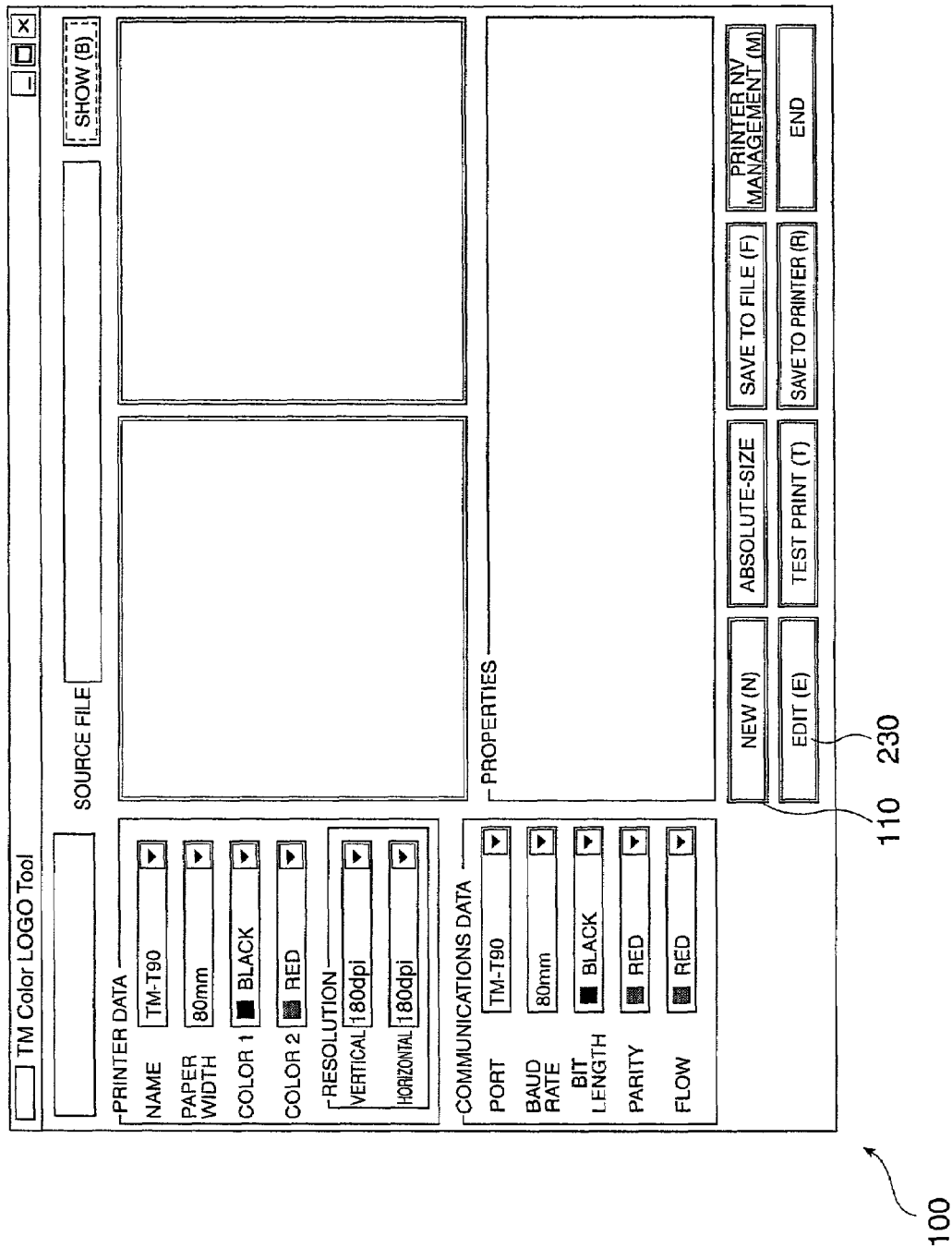
FIG. 10 shows an example of the main display screen for a logo data generating system according to the present invention.

Typical editor screens in a logo data generating system according to this preferred embodiment of the invention are described below with reference to FIGS. 10-13. FIG. 10 shows the main editor screen displayed by a logo data generating system according to the present invention. The first step in creating the logo data is obtaining the source image that is the foundation for the logo. When the logo data generating system starts up, a main screen 100 such as shown in FIG. 10 is presented.

The source image for creating the logo data can be fetched or created by pressing the NEW button 110 on the main screen 100. Clicking the NEW button 110 enables the user to then select a function such as "read file" or "draw." Selecting "read file" option enables the user to read the source image from an image file. Selecting "draw" enables the user to draw or create an image and then save the image to a file.

E2. Editing and Creating Logo Data

Editing and creating the logo data is described with reference to the editor screen shown in FIG. 11, which shows an exemplary logo data editor screen while creating the logo data using the logo data generating system of the present embodiment.

Figure 11:
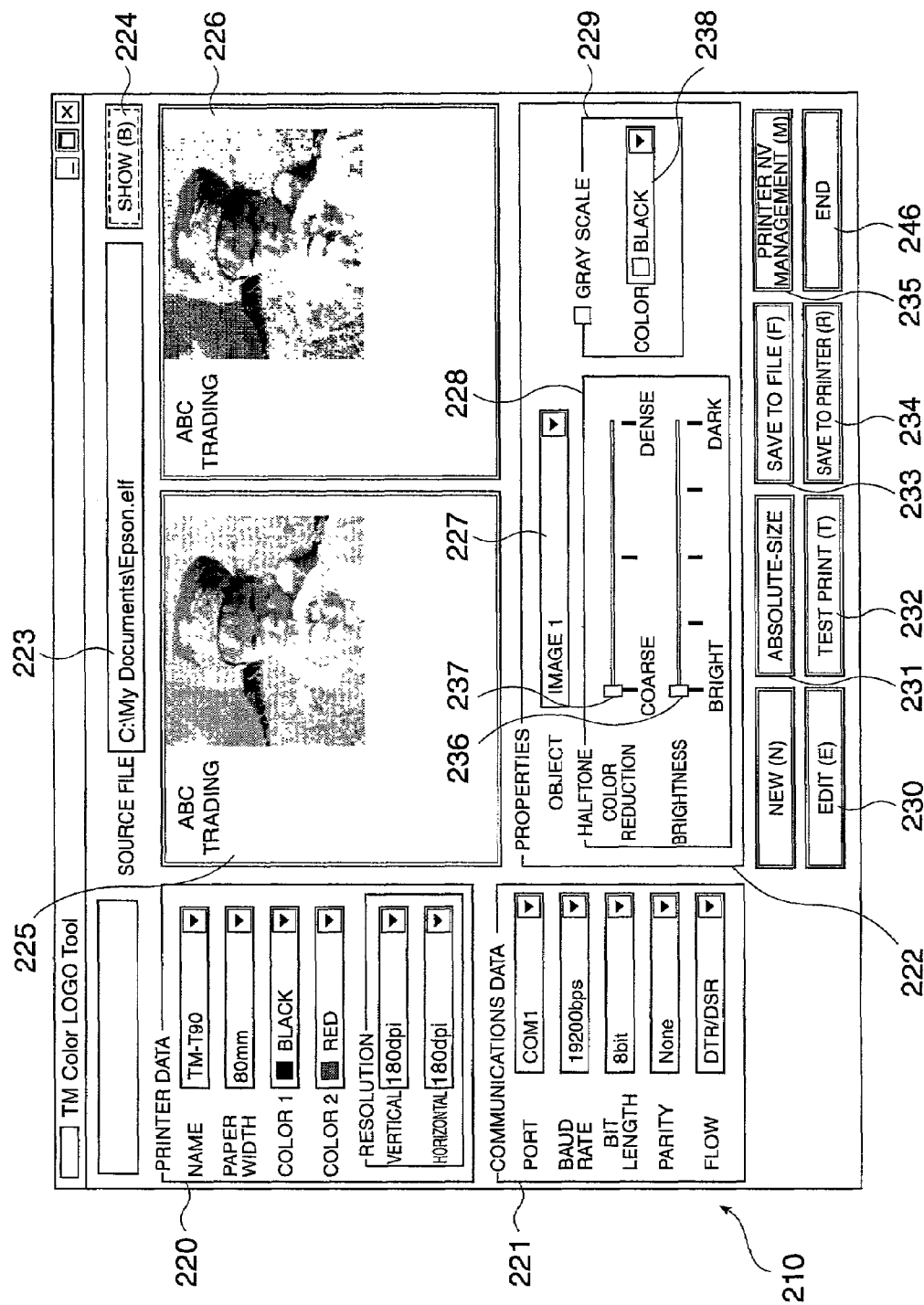
FIG. 11 shows a logo design and editing screen for creating a logo using the logo data generating system according to a preferred embodiment of the invention.

Clicking on the edit button 230 in the main screen 100 brings up the logo data editor screen 210 shown in FIG. 11. If the source image already exists, it can be read from the desired file by entering the file name in the logo source file input area 223 of the editor screen shown in FIG. 11. Note that the source file can be created using various graphic formats. Clicking the reference button 224 presents a pull-down menu of available image files. The read image is then presented in the first display area 225 as the source image. An image of the logo after color reduction and other image processes are applied is shown in the second display area 226.

FIG. 11 shows the logo data editor screen 210 after a source image has been read from a file and various settings have been input. FIG. 11 shows the source image and the image after data processing in a reduced scale, but it will be apparent that the image could be shown full size or even enlarged as desired.

When the file name is entered in the logo source file input area 223 of the main screen 100 (FIG. 10), the content of the specified file is read and stored to specific addresses in the source image capture controller 12 or image processor 13. The stored source data is then reduced or displayed as is to the first display area 225 in the logo data editor screen 210.

Creating the logo data will be limited in size, resolution, printable colors, and other parameters according to the functions and performance of the printer that will be used. It is therefore necessary to specify various information specific to the model of printer that will be used to print the logo (i.e., the model-specific data for the target printer), including the paper width, printable colors, and printer resolution.

The name of the target printer for which the model-specific data is specified, the paper width, usable colors, resolution, and other model-specific data is then input in the printer data selection box 220. The port number, transmission rate, bit length, and other model-specific data for communicating with the printer is also selected from the communications settings box 221. It is also possible to automatically set the model-specific data for the target printer by specifying the printer name or model in the printer data selection box 220 so that the model-specific data for that printer is read from a printer profile stored to a model-specific data storage means (not shown in the figures). If the target printer is connected to the logo data generating system, the model-specific data for that printer could alternatively be set automatically by reading a model ID from the printer. It is also possible to input the printer data by clicking on an icon beside each data input box to select the desired data from a pull-down menu.

Conditions for processing the source image for printing to the printer, including color reduction and assignment, can be set using the properties input box 222 of the logo data editor screen 210. The colors of the source image are then reduced according to the first color, second color, and other parameters in the printer data selection box 220 and the settings in the properties input box 222.

The result of processing the source image according to the model-specific data and other defined properties is then displayed in the second display area 226. For example, if a two-color printer is used, the image can be expressed using three colors, that is, the two printable colors and white (the non-printing color of the print medium). If a low resolution printer is used, the image is also previewed at a low resolution.

While the processed image is shown reduced in the second display area 226 in this example, the full-size button 231 can be clicked to preview the image at the printed size (not shown in the figures).

Setting the conditions for the color reduction process using the properties input box 222 is described next. If the source image consists of two independent image or text components (image 1 and image 2, for example), image 1 and image 2 can be processed separately or can be combined so that the entire source image is processed at the same time.

The objects (image 1, text 2, or complete source image) to be processed are selected from the object selection menu 227 of the properties input box 222. If "image 1" is selected, for example, image 1 is processed according to the method indicated by the halftone selection box 228 and gray scale selection box 229. The logo containing the processed image 1 is then displayed in the second display area 226.

The color reduction slider 237 in the halftone selection box 228 can be moved left and right in this example to specify the color reduction process in stages from "coarse" to "dense." For example, color reduction could be controlled in three stages from coarse to dense using simple color reduction, dithering, and error diffusion. The brightness slider 236 can also slide sideways to control image brightness. In this example image brightness can be expressed in five levels.

Selecting the gray scale selection box 229 enables color reduction to a monochrome scale. Deselecting the gray scale selection box 229 so that it is off enables color reduction to all printable colors (two in this example). When color reduction to a single color is selected, the color can be input to the input box 238 or the color can be selected from a pull-down menu.

Figure 12:
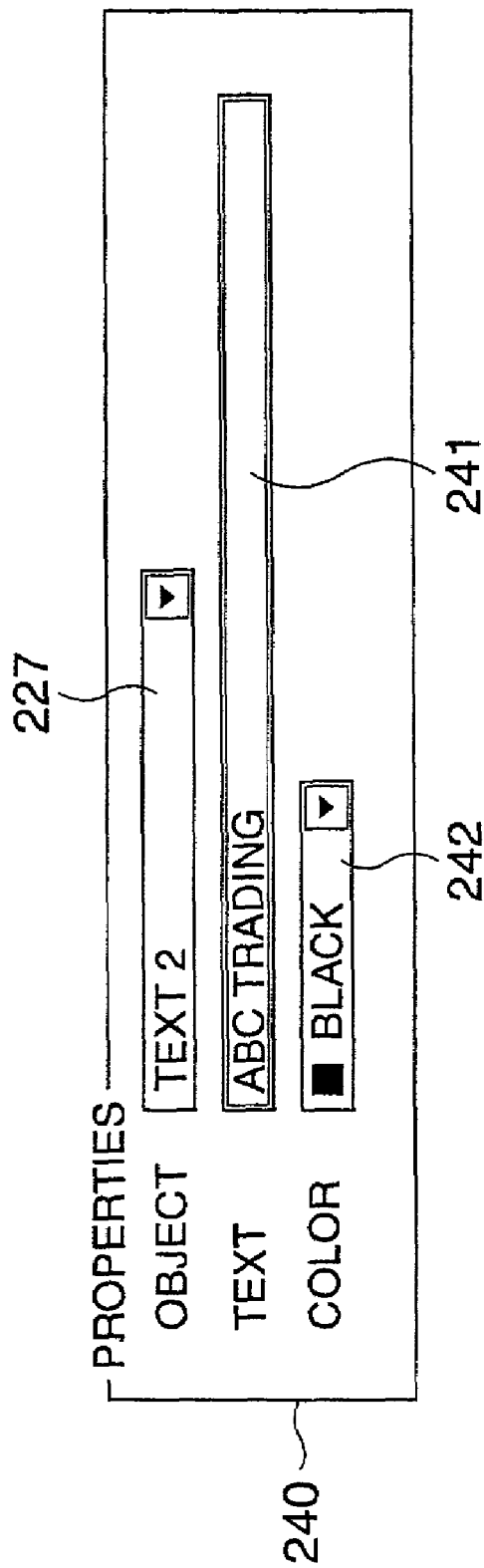
FIG. 12 shows a text input window for a logo data generating system according to a preferred embodiment of the invention.

The properties input box 222 shown in FIG. 11 changes to a text entry box 240 such as shown in FIG. 12 when "TEXT 2" is input to the object selection menu 227 in the properties input box 222. The user can then input the desired text to the text entry box 241, and can select the text color from the color selection menu 242.

Figure 13:
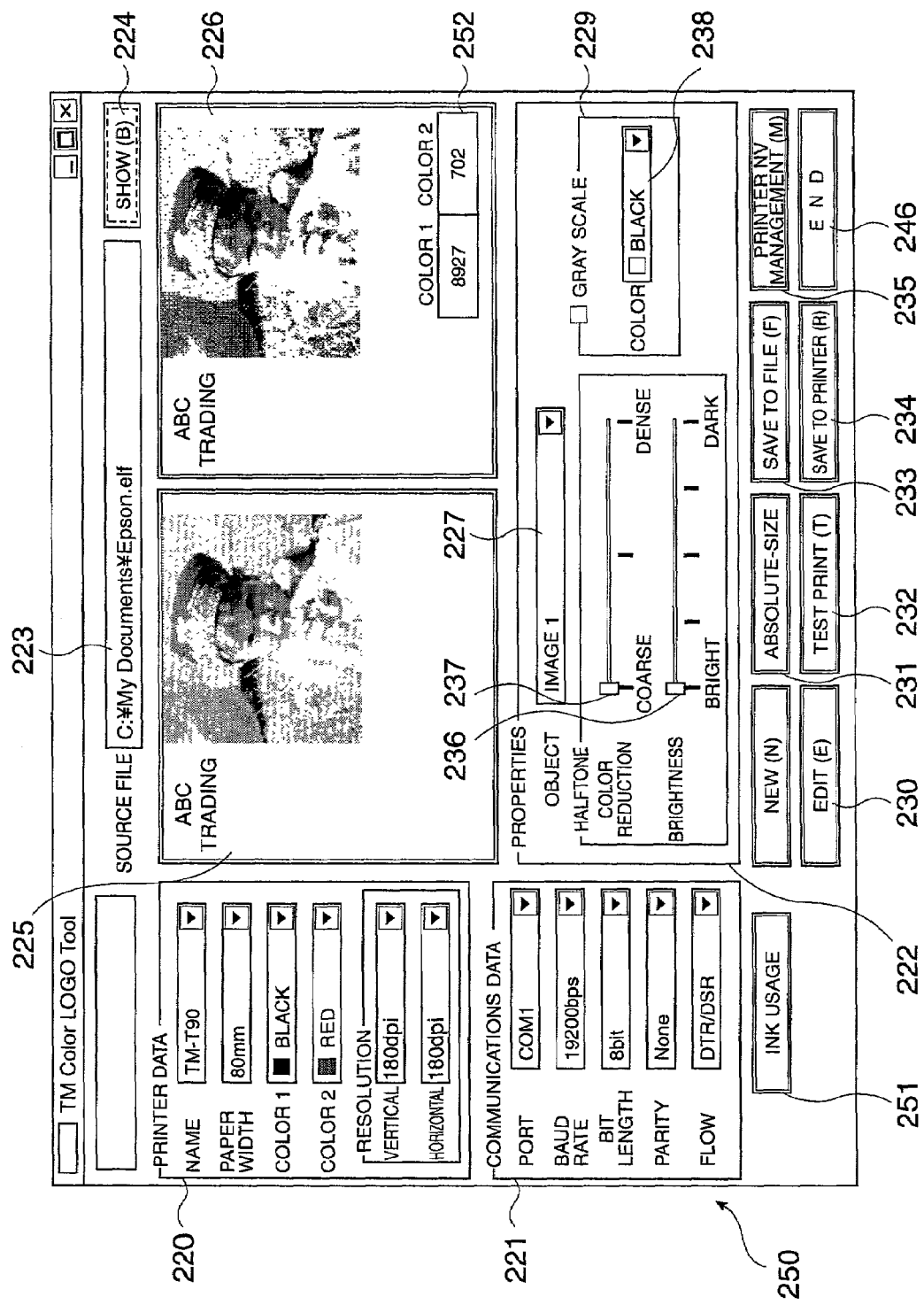
FIG. 13 shows a display screen presenting attribute data indicative of ink consumption on the same screen used for logo data design and editing.

The logo data editor screen 210 in FIG. 11 can also display the attribute data for indicating ink-usage as described in FIG. 1 to FIG. 9. More specifically, a logo data display 31 as shown in FIG. 7 for displaying the number of color pixels in the logo, the color pixel percentages for each color, or the number of color pixels for each color in the logo, can also be provided at desired locations in the logo data editor screen 210 shown in FIG. 11. For example, the content shown in display screen 30 in FIG. 7 can be presented as the display screen 250 in FIG. 13 by providing an ink-usage button 251 at the left on the bottom row using this ink-usage button 251 to make a selection. As shown in FIG. 13, this button 251 can then be selected to display the attribute data 252 indicating ink-usage in the bottom row of the second display area 226.

The editor screen 210 shown in FIG. 11 and the display screen 250 shown in FIG. 13 may each contain additional buttons for manipulating the logo data. In the illustrated embodiments, such buttons include test print 232, save to file 233, save to printer 234, printer management 235, and end 246.

Advantages of the Invention

As demonstrated by the preceding description, the present invention makes it possible to generate logo data with reference to the amount of ink required to print the logo because attribute data regarding the amount of ink required to print the logo can be displayed when the logo data is generated. It is also possible to determine the amount or percentage of ink consumed for each color of ink used, thus enabling the logo to be created so that the colors of ink used for printing can be balanced. It is also possible to calculate the life of the ink cartridge and the number of receipts that can be printed per ink cartridge from this ink consumption information.

While the invention has been described in conjunction with several specific embodiments, many further alternatives, modifications, applications and variations will be apparent to those skilled in the art in light of the foregoing description. Thus, the invention described herein is intended to embrace all such alternatives, modifications, applications and variations as may fall within the spirit and scope of the appended claims.

What is claimed is:

1. An apparatus for creating logo data to be printed by a transaction printer, the apparatus comprising:
   an operating unit;
   a capturing unit for obtaining an original image that is subject to image processing in response to an operation performed via the operating unit;
   an image processing unit for processing the original image to generate logo data for printing by the transaction printer;
      wherein the logo data is image data stored in nonvolatile memory in the transaction printer for printing on a print sheet such as a sales receipt, transaction receipt, or other form;
   an ink-amount calculating unit for calculating data that substantially relates to an ink-amount required for printing the logo data by the transaction printer; and
   a display unit for displaying the logo data and the ink-amount data simultaneously, such that when a change is made to the displayed logo data, the ink-amount calculating unit recalculates an ink-amount for printing the changed logo data on the transaction printer in substantially real-time, and the display unit displays the changed logo data and the recalculated ink amount simultaneously.

2. An apparatus as described in claim 1, wherein the ink-amount calculating unit determines a number of color pixels in the logo data as attribute data.

3. An apparatus as described in claim 1, wherein the logo data contains a plurality of colors and the ink-amount calculating unit determines a pixel count for each color in the logo data as attribute data, and the display unit displays the pixel count for each color as attribute data.

4. An apparatus as described in claim 3, wherein the plurality of logo data colors includes a first printing color, a second printing color, and a non-printing color, the ink-amount calculating unit calculates as attribute data the pixel count of the first color and the pixel count of the second color, and the display unit displays the first color pixel count and the second color pixel count as respective attribute data.

5. An apparatus as described in claim 1, wherein the logo data contains a plurality of colors and the ink-amount calculating unit determines the total number of color pixels for all colors and determines a percentage of each color pixel count relative to the total pixel count, as attribute data.

6. An apparatus as described in claim 1, wherein the logo data contains a plurality of colors and the ink-amount calculating unit calculates a count of color pixels in the logo data and calculates the product of the color pixel count multiplied by an ink amount used to print a pixel, as attribute data.

7. An apparatus as described in claim 1, wherein the logo data contains a plurality of colors and the ink-amount calculating unit calculates a count of color pixels for each color in the logo data and calculates the product of the color pixel count multiplied by an ink amount used to print a pixel for each color in the logo data, as attribute data.

8. An apparatus as described in claim 6, wherein the ink-amount calculating unit reads an amount of ink consumed for one dot stored for each printer model, and calculates ink consumption as the product of the read ink consumption amount multiplied by the color pixel count as attribute data.

9. An apparatus as described in claim 8, wherein the ink-amount calculating unit stores for each type of sheet that can be printed a standard ink-usage for ink-usage other than for printing the logo data, and calculates ink-usage per printed sheet from the standard ink-usage and the ink-usage for logo data printing as attribute data.

10. An apparatus as described in claim 9, wherein the ink-amount calculating unit calculates a number of sheets that can be printed per ink cartridge from a previously stored ink cartridge capacity and calculated ink-usage per printed sheet as attribute data.

11. An apparatus as described in claim 9, wherein the ink-amount calculating unit calculates average ink cartridge life from the calculated ink-usage per printed sheet and a previously stored average number of printed sheets issued in a specific time.

12. An apparatus as described in claim 1, wherein the calculated results from the ink-amount calculating unit can be externally output as print data in conjunction with the logo data.

13. A logo data generating method for generating logo data for printing by a transaction printer, comprising the steps of:
   (a) capturing a source image for image processing;
   (b) generating logo data, including non-printing pixels and color pixels of a single color or multiple colors, by processing the source image based on defined image processing conditions;
   (c) calculating attribute data indicating an amount of ink required to print the logo data being generated by the processing step (b);
   (d) displaying the generated logo data and attribute data simultaneously;
   (e) repeating steps (b) to (d) as needed, wherein each time the logo data is regenerated or changed, attribute data indicating an amount of ink required to print the regenerated or changed logo data is recalculated, and the regenerated or changed logo data is displayed simultaneously with the recalculated attribute data; and
   (f) storing the logo data as image data in nonvolatile memory in the transaction printer for printing on a print sheet such as a sales receipt, transaction receipt, or other form.

14. A logo data generating method as described in claim 13, wherein the attribute data calculating step (c) calculates a number of color pixels in the logo data as attribute data.

15. A logo data generating method as described in claim 13, wherein the attribute data calculating step (c) calculates a pixel count for each color of the color pixels in the logo data as attribute data for each color, and the displaying step (d) displays the pixel count for each color of the color pixels as attribute data.

16. A logo data generating method as described in claim 15, wherein the attribute data calculating step (c) calculates as attribute data the pixel count of a first color and the pixel count of a second color in the logo data when the logo data has a first color, a second color, and a non-printing color, and the displaying step (d) displays the first color pixel count and the second color pixel count as respective attribute data.

17. A logo data generating method as described in claim 13, wherein the attribute data calculating step (c) calculates the total number of color pixels for all colors, and calculates a percentage of each color pixel count relative to the total pixel count, as attribute data.

18. A logo data generating method as described in claim 13, wherein the attribute data calculating step (c) calculates a count of color pixels in the logo data, and calculates the product of the color pixel count multiplied by ink consumption used to print a pixel unit, as the attribute data.

19. A logo data generating method as described in claim 18, wherein the attribute data calculating step (c) calculates a count of color pixels for each color in the logo data, and calculates the product of the color pixel count multiplied by ink consumption used to print a pixel unit for each color in the logo data, as attribute data.

20. A logo data generating method as described in claim 18, wherein the attribute data calculating step (c) reads an amount of ink consumed for one dot stored for each printer type input in the input step (a), and calculates ink consumption as the product of the read ink consumption amount multiplied by the color pixel count as attribute data.

21. A logo data generating method as described in claim 18, wherein the attribute data calculating step (c) calculates ink-usage per printed sheet from the ink-usage for logo data printing and a previously stored standard ink-usage per printed sheet for ink-usage other than for logo data printing.

22. A logo data generating method as described in claim 21, wherein the attribute data calculating step (c) calculates a number of sheets that can be printed per ink cartridge from a previously stored ink cartridge capacity and ink-usage per printed sheet as attribute data.

23. A logo data generating method as described in claim 21, wherein the attribute data calculating step (c) calculates average ink cartridge life from the calculated ink-usage per print sheet and a previously stored average number of printed sheets issued in a specific time.

24. A machine-readable medium embodying a program of instructions for directing a machine to execute a logo data generating method, the program of instructions comprising:
  (a) instructions for capturing a source image for image processing;
  (b) instructions for generating logo data, including non-printing pixels and color pixels of a single color or multiple colors, by processing the source image based on defined image processing conditions;
  (c) instructions for calculating attribute data indicating an amount of ink required to print by a transaction printer the logo data being generated;
  (d) instructions for displaying the generated logo data and attribute data;
  (e) instructions for repeating instructions (b) to (d) as needed, wherein each time the logo data is regenerated or changed, attribute data indicating an amount of ink required to print the regenerated or changed logo data is recalculated, and the regenerated or changed logo data is displayed simultaneously with the recalculated attribute data; and
  (f) instructions for storing the logo data as image data in nonvolatile memory in the transaction printer for printing on a print sheet such as a sales receipt, transaction receipt, or other form.

25. A machine-readable medium as described in claim 24, wherein instructions (c) comprise instructions for calculating a number of color pixels in the logo data as attribute data.

26. A machine-readable medium as described in claim 24, wherein the instructions (c) comprise instructions for calculating a pixel count for each color of the color pixels in the logo data as attribute data for each color, and the instructions (d) comprise instructions for displaying the pixel count for each color of the color pixels as attribute data.

27. A machine-readable medium as described in claim 26, wherein the instructions (c) comprises instructions for calculating as attribute data the pixel count of a first color and the pixel count of a second color in the logo data when the logo data has a first color, a second color, and a non-printing color, and the instructions (d) comprises instructions for displaying the first color pixel count and the second color pixel count as respective attribute data.

28. A machine-readable medium as described in claim 24, wherein the instructions (c) comprises instructions for calculating the total number of color pixels for all colors, and calculating a percentage of each color pixel count relative to the total pixel count, as attribute data.

29. A machine-readable medium as described in claim 24, wherein the instructions (c) comprises instructions for calculating a count of color pixels in the logo data, and calculating the product of the color pixel count multiplied by ink consumption used to print a pixel unit, as the attribute data.

30. A machine-readable medium as described in claim 29, wherein the instructions (c) comprises instructions for calculating a count of color pixels for each color in the logo data, and calculating the product of the color pixel count multiplied by ink consumption used to print a pixel unit for each color in the logo data, as attribute data.

31. A machine-readable medium as described in claim 29, wherein the instructions (c) comprises instructions for reading an amount of ink consumed for one dot stored for each printer type input, and calculating ink consumption as the product of the read ink consumption amount multiplied by the color pixel count as attribute data.

32. A machine-readable medium as described in claim 29, wherein the instructions (c) comprises instructions for calculating ink-usage per printed sheet from the ink-usage for logo data printing and a previously stored standard ink-usage per printed sheet for ink-usage other than for logo data printing.

33. A machine-readable medium as described in claim 32, wherein the instructions (c) comprises instructions for calculating a number of sheets that can be printed per ink cartridge from a previously stored ink cartridge capacity and ink-usage per printed sheet as attribute data.

34. A machine-readable medium as described in claim 32, wherein the instructions (c) comprises instructions for calculating average ink cartridge life from the calculated ink-usage per print sheet and a previously stored average number of printed sheets issued in a specific time.

35. A machine-readable medium as described in claim 24, wherein the machine-readable medium comprises a floppy disc, magneto-optical disc, optical disc, IC memory, magnetic recording tape, or electromagnetic signal capable of the carrying the program of instructions.

36. A machine-readable medium as described in claim 24, wherein the program of instructions includes an executable command set and data set.

37. A host system having a data transmission unit for sending logo data to a transaction printer for printing a logo on a receipt using multiple colors of ink, the host system comprising:

a reading unit for reading source data for logo data being generated on the host system;

a first computing unit for calculating a size for the logo data;

a second computing unit for calculating predicted ink-usage for each color used in the logo data;

a display unit for displaying the logo data and at least one of the logo size calculated by the first computing unit or the ink-usage calculated by the second computing unit simultaneously, wherein when the logo data being generated is changed, the logo size or predicted ink-usage being displayed is recalculated by the corresponding computing unit in substantially real-time, and the display unit displays the changed logo data and the recalculated logo size or predicted ink-usage simultaneously; and wherein the logo data that is sent to the transaction printer is stored as image data in nonvolatile memory in the transaction printer for printing on a print sheet such as a sales receipt, transaction receipt, or other form.

38. A logo data generating method of a host system for sending logo data to a transaction printer printing logo data on a receipt using multiple colors of ink, comprising the steps of:

reading source data for logo data being generated on the host system;

calculating a size for the logo data;

calculating predicted ink-usage for each color used in the logo data; and displaying the logo data and at least one of the logo size calculated by the size calculating step or the ink-usage calculated by the ink-usage calculating step simultaneously, wherein when the logo data being generated is changed or reprocessed, the logo size or predicted ink-usage being displayed is recalculated by the corresponding computing unit in substantially real-time, and the display unit displays the changed logo data and the recalculated logo size or predicted ink-usage simultaneously; and wherein the logo data that is sent to the transaction printer is stored as image data in nonvolatile memory in the transaction printer for printing on a print sheet such as a sales receipt, transaction receipt, or other form.

39. A logo data generating method as described in claim 38, further comprising the step of reprocessing the logo data based on the displayed ink-usage.

\* \* \* \* \*